Patented Apr. 13, 1943

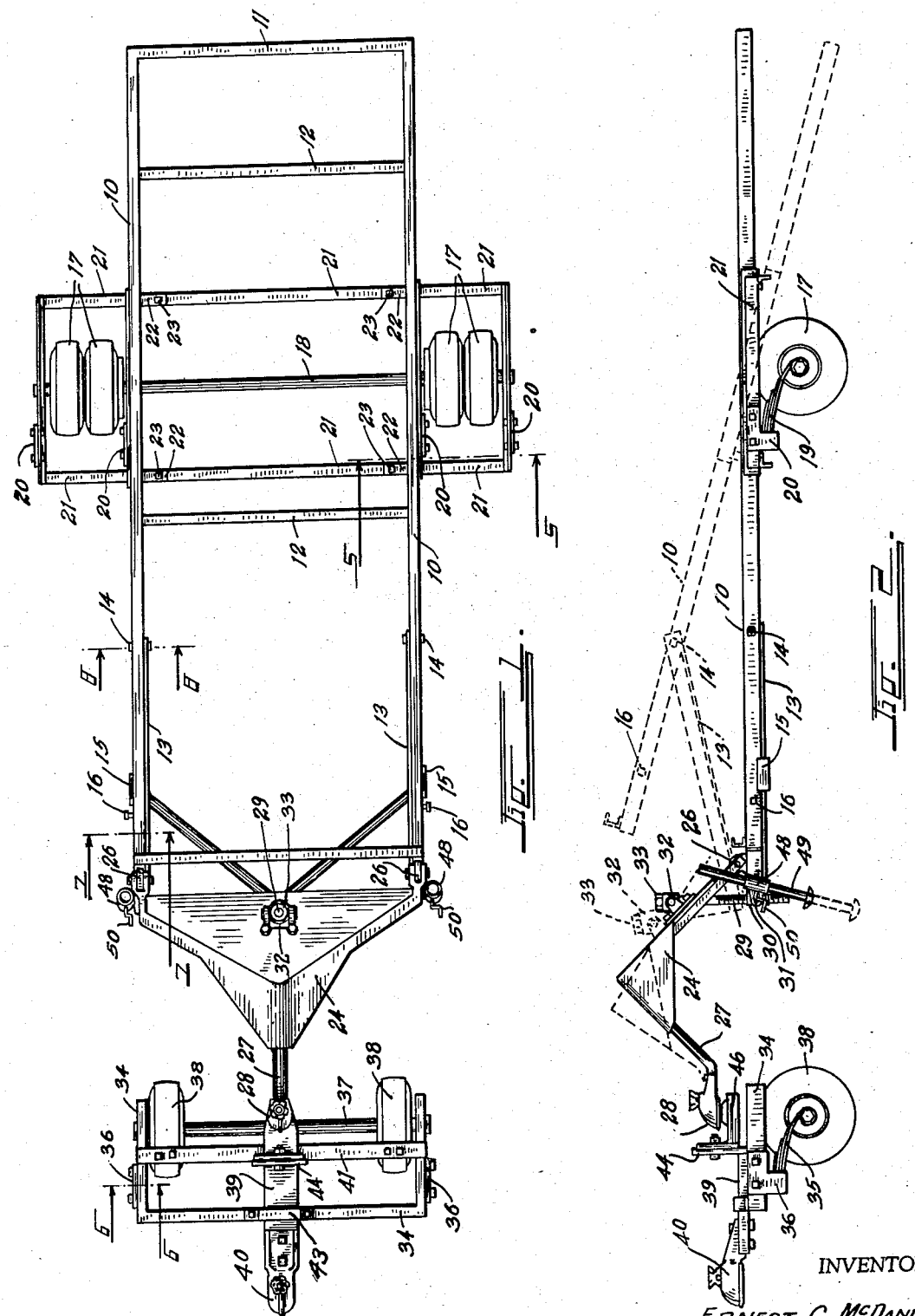

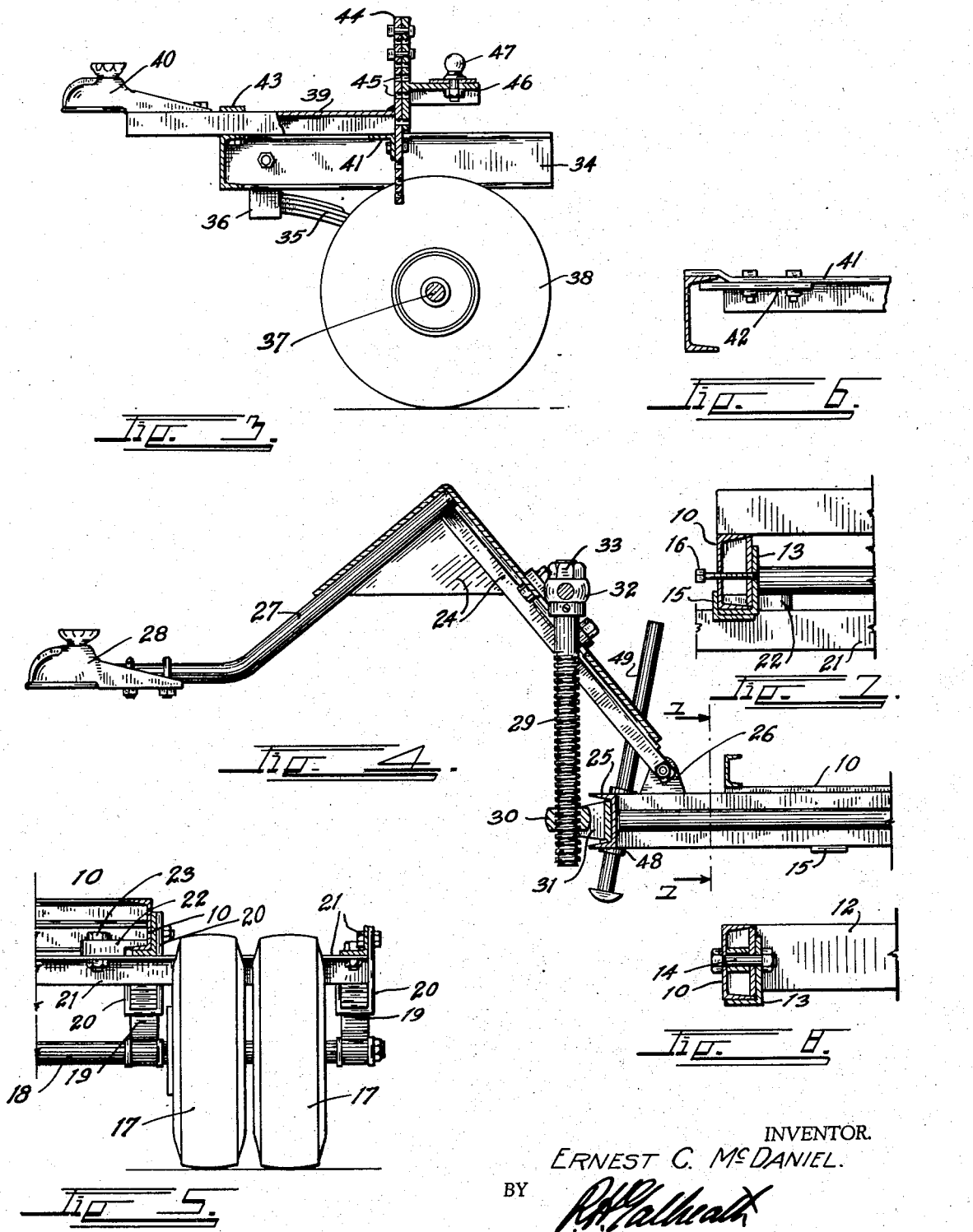

2,316,702

UNITED STATES PATENT OFFICE 2,316,702

MOTOR TRAILER CHASSIS

Ernest C. McDaniel, Denver, Colo.

Application December 13, 1940, Serial No. 369,926

4 Claims. (Cl. 280—33.1)

This invention relates to an automobile trailer chassis.

The principal objects of the invention are: to provide a simple, sturdy and highly efficient chassis which will allow the rearward extremity to be lowered without disturbing the car hitch so that stock, tractors, etc. may be driven directly onto the trailer; to provide a trailer chassis construction in which the position of the supporting wheels can be adjusted forwardly or backwardly to accommodate and properly balance the type of load being carried on the trailer; to provide a hitch structure which can be connected either directly to the tow car or to an intermediate dolly and in which the vertical position of the hitch can be quickly and easily adjusted to suit the position of the towing member or to level the chassis frame of the trailer; and to provide a dolly for towing trailers in the rear of a tow car with which any desired proportion of the weight can be placed on the tow car as desired for tractive purposes.

With this invention, a four-wheeled trailer can be provided whenever desired and the amount of weight on the wheels of the trailer, dolly and the tow car can be accurately adjusted to suit the load requirements.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a plan view of the complete improved trailer chassis;

Fig. 2 is a side view thereof;

Fig. 3 is an enlarged longitudinal section through the towing dolly;

Fig. 4 is an enlarged longitudinal section through the tongue frame of the trailer chassis;

Fig. 5 is a detail enlarged section, taken on the line 5—5, Fig. 1;

Fig. 6 is an enlarged fragmentary detail view illustrating the method of connecting the cross beam with the side frame of the towing dolly;

Fig. 7 is a detailed sectional view, taken on the line 7—7, Fig. 1; and

Fig. 8 is a similar view, taken on the line 8—8, Fig. 1.

The improved trailer chassis employs a main channel frame 10 consisting of two side frame members connected across the rear by means of a rear channel 11. At suitable points, cross brace angles 12 are positioned. A U-shaped front frame 25 extends between the forward extremities of the side frame members 10. The front frame is provided with rearwardly extending angle irons 13 which are pivoted to the main frame 10 on suitable pivot bolts 14. The forward extremities of the side frame members rest in the angle of the angle irons 13 and are held therein by means of angle clips 15.

This construction enables the entire structure to break at the pivot bolts 14, to the broken line position of Fig. 2 so as to allow easy loading and unloading. The two frames are held in their horizontal position by means of set screws 16 which are threaded through the side frame members 10 into the angle irons 13.

The rearward extremity of the frame 10 is supported upon suitable wheels 17 mounted on a cross axle 18 which extends through suitable receiving eyes in a plurality of cantilever springs 19 projecting from spring brackets 20. The spring brackets are beneath a wheel frame 21 extending entirely across the frame 10 beneath the latter and projecting from each side thereof.

As illustrated, the axle 18 extends entirely across the frame 10, it could, if desired, be cut off at each side so as to provide two short axles extending between the springs at each side of the frame to provide a greater clearance beneath the chassis frame.

The frame 21 is movable throughout the entire length of the frame 10 and can be clamped at any desired position thereon by tightening four clamps plates 22, through the medium of clamp bolts 23 which act to clamp the lower flange of the channel of the frame 10.

An A-shaped tongue frame 24 is pivoted at each side of the U-shaped front frame 25, on suitable pivot brackets 26, and terminates at its apex in a downwardly and forwardly extended tongue 27. The forward extremity of the tongue terminates in a standard ball socket 28 of the type ordinarily used for trailer hitches. The angular position of the tongue frame 24 can be adjusted by rotation of a jack screw 29 which is threaded through a pivoted nut 30 in a nut bracket 31 at the front of the frame 25. The upper extremity of the jack screw is rotatably mounted in a pivoted collar 32 and provided with a wrench head 33 by means of which it may be rotated.

This arrangement allows the ball socket 28 to be raised and lowered to accommodate the position of the towing ball upon any desired towing vehicle. The tongue is more particularly designed, however, for connection with an adjustable dolly, such as shown in Fig. 3.

The dolly consists of a horizontal U-shaped dolly frame 34 with its open extremity turned rearwardly. Cantilever springs 35 extend rearwardly and downwardly from spring brackets 36 beneath the dolly frame 34 to engage a wheel axle 37 upon which suitable dolly wheels 38 are mounted.

The dolly frame is provided with a movable tongue 39 terminating at its forward extremity in a towing ball socket 40. The rear extremity of the tongue 39 is secured to a cross beam 41 extending entirely across the dolly frame 34. The two extremities of the cross beam 41 are provided with clamping plates 42 which can be clamped against the upper flange of the channel of the dolly frame to secure the beam 41 at any desired longitudinal position therein. The tongue 39 can also be clamped in any desired extended position by means of a clamp bar 43 which clamps it to the dolly frame 34. The rearward extremity of the tongue 39 supports a vertical attachment plate 44 provided with a series of attachment openings 45. These openings are for securing a ball bracket 46 thereto at any desired height. The ball bracket is provided with the usual hitch ball 47.

This arrangement allows the center of weight on the dolly to be shifted forwardly or backwardly as desired so as to place more or less weight on the tow car to which the ball socket 40 is clamped. It also allows the ball 47 to be raised and lowered to accommodate the height of the tongue of various types of trailers.

The forward extremity of the front frame 25 is provided with leg sleeves 48 in which suitable supporting legs 49 are slidably mounted. The legs can be set at any desired projection by means of set clamps 50.

The jack screw 29 can also be used for raising or lowering the rear extremity of the trailer frame for loading and unloading purposes in case the load is too heavy to be lifted by hand.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A motor trailer comprising: a main frame; wheels tiltably supporting said main frame intermediate its extremities; a dolly frame preceding said main frame; a second pair of wheels tiltably supporting the dolly frome; a first tongue extending forwardly from said main frame; a second tongue extending forwardly from said dolly to engage a towing vehicle, said second tongue being longitudinally adjustable with reference to said dolly frame; and a universal connection on said latter tongue for securing said first tongue thereto so that the connection will follow the longitudinal adjustments of said second tongue.

2. A motor trailer comprising: a main frame; wheels tiltably supporting said main frame intermediate its extremities; a dolly frame preceding said main frame; a second pair of wheels tiltably supporting the dolly frame; a first tongue extending forwardly from said main frame to a universal connection with said dolly frame; a second tongue extending forwardly from said dolly to engage a towing vehicle; means for raising and lowering the forward extremity of said main frame with reference to said universal connection; means for raising and lowering the universal connection on said dolly frame; and means for movably supporting said universal connection on said dolly frame so that it may be moved forward or back with reference to said second pair of wheels.

3. A trailer dolly for supporting the tongue of a trailer comprising: a horizontal, U-shaped frame having its open side turned rearwardly; a cantilever spring extending rearwardly and downwardly at each side of said frame; a wheel axle extending transversely of said frame between said springs; a pair of wheels mounted on said axle; a longitudinally movable tongue extending forwardly from said frame; a cross beam secured to and extending across the rear extremity of said tongue; means for adjustably securing the extremities of said cross beam to the side members of said frame; means on the forward extremity of said tongue for attachment to a towing vehicle; and means on the rearward extremity of said tongue for attachment to a trailer.

4. A trailer dolly for supporting the tongue of a trailer comprising: a horizontal, U-shaped frame having its open side turned rearwardly; a cantilever spring extending rearwardly and downwardly at each side of said frame; a wheel axle extending transversely of said frame between said springs; a pair of wheels mounted on said axle; a longitudinally movable tongue extending forwardly from said frame; a cross beam secured to and extending across the rear extremity of said tongue; means for adjustably securing the extremities of said cross beam to the side members of said frame; means for adjustably securing the forward portion of said tongue to said frame; a vertical plate secured on the rear extremity of said tongue; and extending transversely thereof; a bracket projecting rearwardly from said plate; means for attaching a trailer to said bracket; and means for attaching the forward extremity of said tongue to a towing vehicle.

ERNEST C. McDANIEL.